(12) United States Patent
Lespinats et al.

(10) Patent No.: US 8,972,319 B2
(45) Date of Patent: Mar. 3, 2015

(54) METHOD AND SYSTEM FOR DIMENSIONALITY REDUCTION AND EVALUATING THE CLASS OF A TEST DATUM IN A LARGE-DIMENSION DATA SPACE

(75) Inventors: Sylvain Lespinats, Aix-les-Bain (FR); Michaël Aupetit, Puteaux (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 542 days.

(21) Appl. No.: 13/503,633

(22) PCT Filed: Jun. 2, 2010

(86) PCT No.: PCT/EP2010/057749
§ 371 (c)(1),
(2), (4) Date: Nov. 16, 2012

(87) PCT Pub. No.: WO2011/047889
PCT Pub. Date: Apr. 28, 2011

(65) Prior Publication Data
US 2013/0132310 A1 May 23, 2013

(30) Foreign Application Priority Data
Oct. 23, 2009 (FR) .................................... 09 05116

(51) Int. Cl.
*G06F 17/00* (2006.01)
*G06N 99/00* (2010.01)
*G06K 9/62* (2006.01)

(52) U.S. Cl.
CPC ............ *G06N 99/005* (2013.01); *G06K 9/6234* (2013.01); *G06K 9/6251* (2013.01)
USPC .......................................................... 706/45

(58) Field of Classification Search
USPC ..................................................... 706/12, 45
See application file for complete search history.

(56) References Cited

U.S. PATENT DOCUMENTS

2008/0082468 A1* 4/2008 Long et al. ...................... 706/12
2009/0097733 A1 4/2009 Hero, III et al.

OTHER PUBLICATIONS

D. De Ridder, et al., "Supervised Locally Linear Embedding," Lecture Notes in Artificial Intelligence, 2714, pp. 333-341, 2003.
D. De Ridder, et al., "Local Fisher Embedding," Proceedings of the 17th International Conference on Pattern Recognition, 2004, pp. 295-298.
R. A. Fisher, et al., "The Use of Multiple Measurements in Taxonomic Problems," Annals of Eugenics, No. 7, pp. 179-188, 1936, Gilbert.

(Continued)

*Primary Examiner* — David Vincent
(74) *Attorney, Agent, or Firm* — Baker Hostetler LLP (57) ABSTRACT

A method and a system for evaluating the class of a test datum in an original metric space, each datum belonging to at least one class grouping a plurality of data, includes a step of graphical representation of the spatial organization of a set of learning data of the original space in a representation metric space, a conjoint membership level indicating if any two data from the learning set belong to the same class. The method also includes a step of relating the test datum to the projections of the data from the learning set, the most probable class of the test datum being the class of the projections of the data from the learning set related to the test datum. Application: assistance with decision-making in discrimination, shape recognition.

32 Claims, 3 Drawing Sheets

(56) References Cited

OTHER PUBLICATIONS

X. Geng, et al., "Supervised Nonlinear Dimensionality Reduction for Visualization and Classification," IEEE Transactions on Systems, Man, and Cybernetics, Part B, 35(6), vol. 35, No. 6, pp. 1098-1107, Dec. 6, 2005.

O. Kouropteva, et al., Beyond Locally Linear Embedding Algorithm—Technical Report MVG-01-2002, Machine Vision Group, University of Oulu, Sep. 20, 2002.

H. Lanaaya, et al., "A New Dimensionality Reduction Method for Seabed Characterization: Supervised Curvilinear Component Analysis", IEEE Oceans 05 Europe, Brest, France, pp. 20-23, Jun. 2005.

S. Lespinats, et al., "DD-HDS: A Method for Visualization and Exploration of High-Dimensional Data," IEEE Transactions on Neural Networks, IEEE Service Center, Piscataway, NJ, US, vol. 18, No. 5, Sep. 1, 2007, pp. 1265-1279, XP011191397.

S. Lespinats, et al., "False neighbourhoods and tears are the main mapping defaults. How to exhibit remaining ones?" Quality Issues, Measures of Interestingness and Evaluation of Data Mining Models (QIMIE '09), Proc. 13th Pacific-Asia Conference on Knowledge Discovery and Data Mining (PAKDD '09), Apr. 27, 2009, pp. 55-65, XP002606695.

C. Li, et al., "Supervised Isomap With Explicit Mapping", Proceedings in the 1st IEEE International Conference on Innovative Computing, Information and Control, ICICIC 2006, Beijing, China, Aug. 2006.

S. Mika, et al., "Fisher Discriminant Analysis With Kernels", 1999 IEEE, Berlin, Germany, 1999.

W. Tang, et al., "Chapter 15: Pairwise Constraints-Guided dimensionality Reduction," Jan. 1, 2007, Computational Methods of Feature Selection; [Chapman & Hall/CRC Data Mining and Knowledge Discovery Series], Boca Raton, Fla. [U.A.]: Capman & Hall/CRC, US, pp. 295-312, XP008128200, the whole document.

J. Venna: "Dimensionality reduction for visual exploration of similarity structures," Jun. 2007, Helsinki University of Technology, XP002606694, pp. 1-81.

S. Weng, "Exploring the structure of supervised data by Discriminant Isometric Mapping," Pattern Recognition 38, pp. 599-601, 2005.

\* cited by examiner

METHOD AND SYSTEM FOR DIMENSIONALITY REDUCTION AND EVALUATING THE CLASS OF A TEST DATUM IN A LARGE-DIMENSION DATA SPACE

CROSS-REFERENCE TO RELATED APPLICATION

This application is a National Stage of International patent application PCT/EP2010/057749, filed on Jun. 2, 2010, which claims priority to foreign French patent application No. FR 0905116, filed on Oct. 23, 2009, the disclosures of which are incorporated by reference in their entirety.

FIELD OF THE INVENTION

The present invention concerns a method and a system for evaluating the class of a test datum in an original metric space, each datum belonging to at least one class grouping a plurality of data. For example, the datum may be a digitized datum including one or more measurements of physical characteristics of an object, which object may be a material object, a person, the state of a system, or a group of such objects, persons or states, physical characteristics of which are measured.

The invention is notably applied in the field of assisting decision-making in discrimination, more particularly in the field of shape recognition. For example, the invention finds application in assisting medical diagnosis, such as the diagnosis of melanomas, or in discriminating the nature of seismic events.

BACKGROUND

Discriminators are not entirely suited to the field of assisting decision-making. When a datum is presented to a discriminator, the latter proposes a decision on belonging to a class (possibly provided with a belonging index), a class being a set of data having analogies. However, the user is generally not expert in statistical learning and classification. There is then the fear that the decision rendered by the discriminator may be considered with too much confidence or skepticism, some users systematically accepting the automatic decision, others never acting on them.

One solution to remedy this problem is the use of a dimensionality reduction method enabling the data to be represented in a Euclidian space, usually with two or three dimensions, preserving the distances between data. A critical point for the understanding of data by the user is that the data is generally of large dimension, and therefore unintelligible. Hereinafter, the expression "original data" refers to all of the data enabling construction of the representation and the expression "points of the representation" refers to its equivalents in the representation space. Thus the expression "original space" will designate the space of the original data and the expression "representation space" will designate the space over which the representation is completed, this space being sometimes referred to as a "map". Thus dimensionality reduction methods enable the relations between data to be summarized in the form of a map on which the position of the points may be described with the aid of a small number of parameters. This enables a user to have an intuitive vision of the organization of the data in the original space. Understanding the distribution of the classes then offers the user a means of making an informed decision. In particular, one popular means consists in constructing a map of the data in a plane and optimizing the preservation of the distances.

The benefit of this type of approach may be illustrated by an example relating to the recognition of objects that consist of handwritten characters. In this example, the data may consist of 8×8 pixel grayscale imagettes of handwritten digits, in which case an imagette may be seen as a point in a space with 64 dimensions. The data may thus belong to ten classes corresponding to the ten digits from 0 to 9. It is then a question of placing the imagettes in a two-dimensional space formed by the map so that the Euclidian distance between the representations of two imagettes on this map is as close as possible to the distance between the two imagettes themselves in the original space in the sense of a measurement of dissimilarity. Accordingly, the proximity of two imagettes is materialized by the proximity of the points that are associated with them on the map.

Most existing methods for constructing a data map are non-supervised methods, i.e. methods that do not take account of the data possibly belonging to classes of data in order to place them on the map. For example, in the case of imagettes of handwritten digits, the data may be divided into ten balanced classes corresponding to the ten digits (0, 1, 2, . . . , 9), each imagette being labeled as belonging to one of these ten classes. A non-supervised method thus leads to a map of the imagettes in which the imagettes are placed without taking account of the digits that they represent. A major drawback of this is that classes may be mixed without this corresponding to a reality specific to the data. In such cases, an essential character of the data set is lost. Moreover, the organization of the representation offered to the user may become relatively illegible.

A classic supervised solution is discriminating factorial analysis (DFA) (see Fisher R. A., "The Use of Multiple Measurements in Taxonomic Problems", Annals of Eugenics, No. 7, p. 179-188, 1936; Gilbert Saporta, Probabilités, Analyse des données et Statistique, 2006), which is a linear method enabling a supervised representation of the data to be proposed. The object of this method is to find a subspace in which the orthogonal projection of the data provides the best discrimination of the classes, i.e. the method searches for the projection that minimizes the ratio between the intra-class and inter-class variance. This method has two major drawbacks, however. On the one hand, DFA is linear, and is therefore not efficacious if non-linear relations exist between variables. On the other hand, DFA assumes that the data space is Euclidian.

A generalization of DFA intended to take account of non-linear relations by using the "kernel trick" has also existed since 1999. This method, known as "Kernel Fisher Discriminant Analysis" (KFD) (Mika S., Rätsch G., Weston J., Schölkopf B., Müller K-R., "Fisher Discriminant Analysis with Kernels", Neural Networks for Signal Processing, Vol. 9, 1999, p. 41-48) functions in a manner comparable to DFA, but in a space augmented by the kernel used. This method has the usual drawbacks of kernel methods, however. In particular, it is indispensible to choose a kernel, which is not a simple matter, as indicated by the abundant literature on this subject. Moreover, a relatively simple model implicit in the data is assumed. However, there exist numerous data sets to which this assumption does not apply.

A number of "pseudo-supervised" dimensionality reduction methods have also been proposed. They mostly correspond to non-supervised methods in which the distances undergo preprocessing before placement on the map. The following methods may be cited:

"Supervised Curvilinear Components Analysis" (Laanaya H., Martin A., Aboutajine D. and Khenchaf A., "A New Dimensionality Reduction Method for Seabed Characterization: Supervised Curvilinear Component Analysis", IEEE OCEANS'05 EUROPE, Brest, France, 20-23 Jun. 2005; Laanaya H., Martin A., Khenchaf A. and Aboutajine D. "Une nouvelle méthode pour l'extraction de paramètres: l'analyse en composante curvilinéaire supervisee, Atelier Fouille de données complexes dans un processus d'extraction de connaissance", Extraction et Gestion des Connaissances (EGC), pp. 21-32, Namur, Belgium, 24-26 Jan. 2007);

"Supervised Locally Linear Embedding" (O. Kouropteva, O. Okun, A. Hadid, M. Soriano, S. Marcos, and M. Pietikainen., "Beyond locally linear embedding algorithm—Technical Report MVG-01-2002", Machine Vision Group, University of Oulu, 2002; D. de Ridder, O. Kouropteva, and O. Okun., "Supervised locally linear embedding—Lecture Notes in Artificial Intelligence", 2714:333-341, 2003; D. de Ridder, M. Loog, M. J. T. Reinders, "Local Fisher embedding", in Proceedings of the 17th International Conference on Pattern Recognition, 2004, pp. 295-298);

"Supervised Isomap (S-isomap)" (S. Weng, C. Zhang, Z. Lin, "Exploring the structure of supervised data by discriminant isometric mapping", Pattern Recognition 38 (2005) 599-601; Geng X., Zhan D. C. and Zhou Z. H., "Supervised nonlinear dimensionality reduction for visualization and classification", IEEE Transactions on Systems, Man, and Cybernetics, Part B 35(6): 1098-1107, 2005);

"SE-isomap" (Li C. G. and Guo J., "Supervised isomap with explicit mapping", in Proceedings in the 1st IEEE International Conference on Innovative Computing, Information and Control, ICICIC '06, Beijing, China, August 2006).

One way or another, these "pseudo-supervised" methods always use a matrix of the modified distances in order to increase artificially the inter-class distances and/or to reduce the intra-class distances. A non-supervised method is then employed that uses the modified distances. Thus the classes are always visually identifiable in the representation, even if the classes are perfectly mixed in the data space. This kind of technique is thus more of a means of visualizing the classes individually than a means of apprehending the spatial organization of the data, the latter being highly degraded by the pre-processing. Moreover, because of the manipulation of distances, the distances in the original and representation spaces are no longer comparable with techniques of this kind. This may prove disadvantageous if the distances themselves make sense to the user, as in the case where they wish to use map evaluation methods (Shepard diagram, etc.) or to place points a posteriori without knowing the class. This latter point is particularly disadvantageous in the field of discrimination decision assistance, i.e. when it is a question of determining the class of a test datum knowing the reference data class.

A non-supervised dimensionality reduction method known as "Data-Driven High Dimensional Scaling" (DD-HDS) (Lespinats S., Verleysen M., Giron A. and Fertil B., "DD-HDS: a tool for visualization and exploration of high dimensional data", IEEE Trans. Neural Netw., Vol. 18, No. 5, pp. 1265-1279, 2007) was developed to overcome the aforementioned drawbacks. The DD-HDS method suggests, among other things, using a weighting function G enabling more or less importance to be assigned to distances according to whether they are large or small, taking into account the phenomenon of concentration of the measurement. This method makes it possible for example to visualize in spaces with two or three dimensions data from much larger spaces, preserving the spatial organization of the data. This makes it possible to visualize classes if a link exists between the classes and the spatial organization of the data. Unfortunately, as explained hereinafter, in difficult cases it is impossible to avoid making representation errors, whether the method is supervised or not. The differences between the results of the most efficacious methods are generally linked to the position of said errors. Now, in the context of the DD-HDS method, such errors may well impede reading of the map by scrambling an organization linked to the classes. In such a situation, it becomes hazardous to determine the class of an unlabeled datum from its position on the map.

SUMMARY OF THE INVENTION

A notable aim of the invention is to preserve the spatial organization of the data by favoring the expression of the classes, to facilitate the decision of the user as to the class to which an unlabeled datum belongs. To this end, the invention proposes to optimize the positioning of the points by preserving the distances, a weighting function enabling the size of each distance to be quantified. It is therefore of considerable benefit in the field of assisting decision-making, where an intuitive presentation of the organization of the data proves very beneficial. Adding class information considerably simplifies the error positioning choices. The non-linear supervised method of the invention operates on the weights assigned to the distances upon convergence of the algorithm to reduce the drawbacks of any representation errors if they do not degrade the organization of the classes. Accordingly, even if errors are necessary for the representation of the data, they are guided toward regions in which they are less disadvantageous. The result of this is a representation of the spatial organization of the data that is particularly reliable, grouping data of the same class when this is compatible with the distances in the original space and the constraints of the representation space. It is thereafter easier for the user to determine the class of an unlabeled datum.

To this end, the invention provides a method for evaluating the class of a test datum in an original metric space, each datum belonging to at least one class grouping a plurality of data. The method includes a step of graphical representation of the spatial organization of a set of learning data of the original space in a representation metric space, a conjoint membership level indicating if any two data from the learning set belong to the same class. This graphical representation step includes a step of projecting data from the learning set toward the representation metric space, the positions of the projections of the data in the representation space being those that minimize or maximize a function E. The function E depends on the differences between the weighted distances between the data from the learning set in the original space and the distances between their respective projections in the representation space. The weighting assigned in the function E to a distance between two data from the learning set depends on the fact that these two data belong to the same class, so as to preserve in the representation space the relative spatial organization of the classes. The graphical representation step also includes a step of representation of the projections of the data from the learning set. The method also includes a step of relating the test datum to the projections of the data from the learning set, the most probable class of the test datum being the class of the projections of the data from the learning set related to the test datum.

For example, the data may be digitized data that may include one or more measurements of physical characteristics of an object, whether that be a material object or a person or the state of a system, or whether that be a group of such objects, persons or states, physical characteristics of which can be measured.

The relative spatial organization of the classes may advantageously be preserved in the representation space in that two distinct classes of data from the learning set have the projections of their data assembled in two respective disjoint connected areas if the data of these two classes is itself assembled in two disjoint connected areas of the original space. Thus, in a preferred embodiment, the relating step may include a step of projection of the test datum into the representation space, where the most probable class of the test datum may be the class corresponding to the connected area in which the projection of the test datum is located.

For example, the original metric space may have $N \geq 3$ dimensions and the representation metric space may have 2 or 3 dimensions.

The projections of the data from the learning set may advantageously be represented in an orthonomic frame of reference of the representation metric space.

In a preferred embodiment, a distance $d^*_{ij}$ in the representation space between the projections of any two data i and j from the learning set may be the distance that minimizes a stress function $$E = \sum_{i,j} E_{ij}.$$

$E_{ij}$ may be a local stress function depending on the distance between the data i and j, such as $E_{ij}=F(d_{ij},d^*_{ij}) \times G(d_{ij},d^*_{ij})$, where $d_{ij}$ may be a measurement of dissimilarity between the data i and j in the original space and $d^*_{ij}$ may be the distance between the projections of the data i and j in the representation space. F may be a function that quantifies the difference between $d_{ij}$ and $d^*_{ij}$, F being minimum when $d_{ij}=d^*_{ij}$. G may be a weighting function such as $G(d_{ij},d^*_{ij})=\phi(G^{int\ ra}(d_{ij},d^*_{ij})$, $G^{int\ er}(d_{ij},d^*_{ij}),C_{ij})^*$, where $C_{ij}$ may be the conjoint membership level having a value in a real interval, $G^{int\ ra}$ and $G^{int\ er}$ may be weighting functions, and $\phi$ may be a function such that there exists at least one value of $C_{ij}$ for which $G=G^{int\ ra}$ and at least one value of $C_{ij}$ for which $G=G^{int\ er}$.

For example, the conjoint membership level may have a value in $\{0,1\}$ and may have the value 1 if i and j belong to the same class and the value 0 otherwise.

For example, $F(d_{ij},d^*_{ij})=|d_{ij}-d^*_{ij}|^2$, $G^{int\ ra}(d_{ij},d^*_{ij})=g(d_{ij})$ and $G^{int\ er}(d_{ij},d^*_{ij})=g(d^*_{ij})$, where g may be the inverse sigmoid function with parameter $\lambda$.

The present invention also provides a method for assisting a user to decide on the class of a test datum in a data space of N dimensions where $N \geq 3$, each datum belonging to a class grouping a plurality of data. The method includes a step according to the invention of evaluating the class of the test datum and a step of presentation to the user of the most probable class for the test datum.

In a preferred embodiment, the method may include a step of the user assigning a class to the test datum and the class assigned by the user to the test datum may be the same or not the same as the most probable class.

For example, the data may consist of digitized handwritten characters, the classes being able to group identical characters. The data may also consist of digitized seismic curves, one class may group curves of which the recording corresponds to an earth tremor and another class may group curves of which the recording does not correspond to an earth tremor. The data may also consist of digital photographs of melanomas, one class may group photographs of malignant melanomas and another class may group photographs of benign melanomas.

The present invention further provides a system for evaluating the class of a test datum in an original metric space, each datum belonging to at least one class grouping a plurality of data. The system includes a module for graphical representation of the spatial organization of a set of learning data of the original space in a representation metric space, a conjoint membership level indicating if any two data from the learning set belong to the same class. The representation module includes a module for projecting data from the learning set toward the representation metric space, the positions of the projections of the data in the representation space being those that minimize or maximize a function E. The function E depends on the differences between the weighted distances between the data from the learning set in the original space and the distances between their respective projections in the representation space. The weighting assigned in the function E to a distance between two data from the learning set depends on the fact that these two data belong to the same class, so as to preserve in the representation space the relative spatial organization of the classes. The graphical representation module also includes a module for representing the projections of the data from the learning set. The system also includes a module for relating the test datum to the projections of the data from the learning set, the most probable class of the test datum being the class of the projections of the data from the learning set related to the test datum.

For example, the data may consist of digitized data and the digitized data may include one or more measurements of physical characteristics of an object, whether that be a material object or a person or the state of a system, or whether that be a group of such objects, persons or states, physical characteristics of which can be measured.

The relative spatial organization of the classes may advantageously be preserved in the representation space in that two distinct classes of data from the learning set have the projections of their data assembled in two respective disjoint connected areas if the data of these two classes is itself assembled in two disjoint connected areas of the original space. In a preferred embodiment, the relating module may include a module for projecting the test datum into the representation space, the most probable class of the test datum being the class corresponding to the connected area in which the projection of the test datum is located.

For example, the original metric space may have $N \geq 3$ dimensions and the representation metric space may have 2 or 3 dimensions.

The projections of the data from the learning set may advantageously be represented in an orthonomic frame of reference of the representation metric space.

In a preferred embodiment, a distance $d^*_{ij}$ in the representation space between the projections of any two data i and j from the learning set may be the distance that minimizes a stress function $$E = \sum_{i,j} E_{ij}.$$

$E_{ij}$ may be a local stress function depending on the distance between the data i and j, such that $E_{ij}=F(d_{ij},d^*_{ij}) \times G(d_{ij},d^*_{ij})$, where $d_{ij}$ may be a measurement of dissimilarity between the data i and j in the original space and $d^*_{ij}$ may be the distance between the projections of the data i and j in the representation space. F may be a function that quantifies the difference between $d_{ij}$ and $d^*_{ij}$, F being minimum when $d_{ij}=d^*_{ij}$. G may be a weighting function such as $G(d_{ij},d^*_{ij})=\phi(G^{int\ ra}(d_{ij},d^*_{ij}), G^{int\ er}(d_{ij},d^*_{ij}),C_{ij})^*$, where $C_{ij}$ may be the conjoint membership level having a value in a real interval, $G^{int\ ra}$ and $G_{int\ er}$ may be weighting functions, and $\phi$ may be a function such that there exists at least one value of $C_{ij}$ for which $G=G^{int\ ra}$ and at least one value of $C_{ij}$ for which $G=G^{int\ er}$.

For example, the conjoint membership level may have a value in $\{0,1\}$, and may have the value 1 if i and j belong to the same class and have the value 0 otherwise.

For example, $F(d_{ij},d^*_{ij})=|d_{ij}-d^*_{ij}|^2$, $G^{int\ ra}(d_{ij},d^*_{ij})=g(d_{ij})$ and $G^{int\ er}(d_{ij},d^*_{ij})=g(d^*_{ij})$, where g may be the inverse sigmoid function with parameter $\lambda$.

The present invention further provides a system for assisting a user to decide on the class of a test datum in a data space of N dimension where N≥3, each datum belonging to a class grouping a plurality of data. The system includes a subsystem according to invention for evaluating the class of the test datum and a module for presentation to the user of the most probable class for the test datum.

In a preferred embodiment, the system may include a module enabling the user to assign a class to the test datum, the class assigned by the user to the test datum may be the same or not the same as the most probable class.

For example, the data may consist of digitized handwritten characters and the classes may group identical characters. The data may consist of digitized seismic curves, one class may group curves of which the recording corresponds to an earth tremor and another class may group curves of which the recording does not correspond to an earth tremor. The data may also consist of digital photographs of melanomas, one class may group photographs of malignant melanomas and another class may group photographs of benign melanomas.

The main advantages of the invention are that it also takes account of the inter-class organization, the intra-class organization, and ambiguous data and "outliers". It also enables emphasis to be placed on the absence of organization into classes when classes are very mixed in the original space, because it does not degrade the original distances.

Moreover, the invention proposes a non-linear method that remains efficacious if non-linear relations exist between variables.

BRIEF DESCRIPTION OF THE DRAWINGS

Other features and advantages of the invention will become apparent in the light of the following description given with reference to the appended drawings in which.

DETAILED DESCRIPTION

Figure 1:
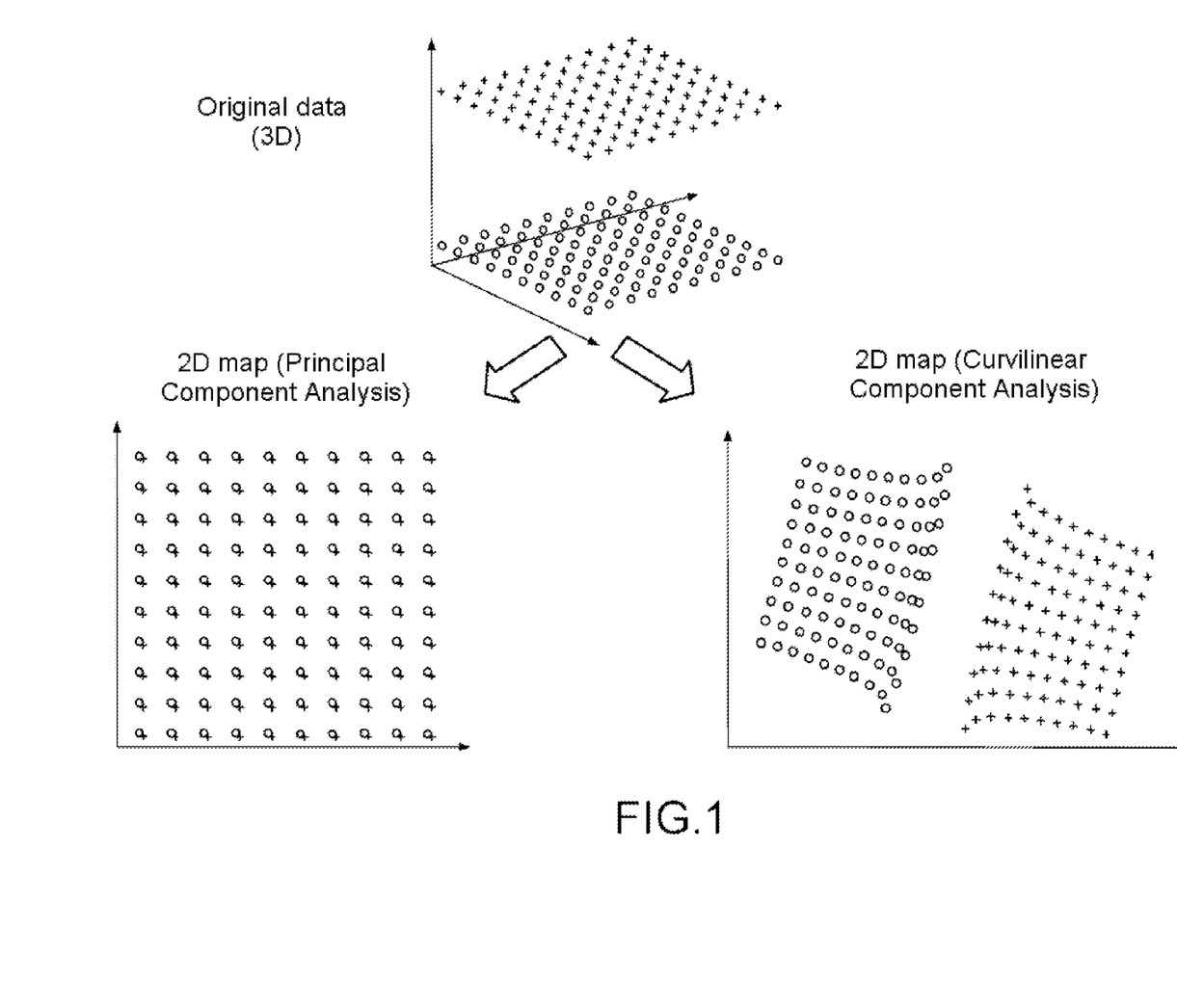
FIG. 1 shows an example of false neighborhoods and tears.

FIG. 1 shows bottom left an example of false neighborhoods produced by Principal Component Analysis (PCA) and bottom right an example of tears produced by Curvilinear Component Analysis (CCA). One principle of the invention is to penalize false neighborhoods more or less depending on the circumstances, i.e. far data represented as near, and tears, i.e. close data represented as far away. The invention proposes to concentrate on the avoidance of tears within classes and false neighborhoods between classes. Thus when they exist intra-class continuity and class separation are given preference.

For the data set used to generate the map, the degree of conjoint membership between each data pair is known a priori, which is why this data set will be referred to as the "learning base", as opposed to data added a posteriori, which will be referred to as "test data" and the class of which is generally not known. It should be noted that the set of classes does not necessarily form a data partition of the learning base, although this is most often the case. A datum may belong to a plurality of classes. It is assumed that there exists a measure of dissimilarity between data from the learning base. Let it be noted here that any type of measurement or of dissimilarity may be used, given that a dissimilarity is a function that verifies two of the three properties of a distance, namely symmetry and separation, but which does not necessarily verify the triangular inequality. This is a major advantage of the invention compared to most discriminators, which often assume, at least implicitly, that the data space is Euclidian.

As explained above, it is a matter of projecting data from the learning base into a representation space. This space is most commonly a plane, i.e. a Euclidian space with two dimensions, but it is possible to produce a representation in different metric spaces, depending on the characteristics of the data of the learning base and/or depending on the targeted objectives. The projection preserves the distances between data by giving preference to short distances.

Hereinafter, the representation of a datum i in the representation space will be called a point i. The "ideal" projection of the data may advantageously be obtained by optimization: the data may be placed in the representation space in such a manner as to minimize or maximize a function denoted E generally called the "stress" function.

In the present example, it may for instance be a question of minimizing a function E defined on the basis of a local stress denoted $E_{ij}$ that is linked to the distance between two points i and j and that is given by equation 1 below:

$$E_{ij}=F(d_{ij},d^*_{ij})\times G(d_{ij},d^*_{ij}) \qquad (\text{eq. 1})$$

in which $d_{ij}$ is the dissimilarity concerned between the data i and j, and $d^*_{ij}$ is the distance between the associated points in the representation space.

In the present example:
the stress is the sum of the local stresses:

$$E=\sum_{i,j} E_{ij};$$

F is a function quantifying the difference between $d_{ij}$ and $d^*_{ij}$, F thus taking a minimum value when $d_{ij}=d^*_{ij}$ (or a maximum value if E must be maximized);

G is a weighting function enabling more or less importance to be assigned to the distances according to the objective. The invention proposes to adapt G according to whether $d_{ij}$ corresponds to an inter-class distance or an intra-class distance, as expressed by equation 2 below:

$$G(d_{ij},d^*_{ij})=\phi(G^{int\ ra}(d_{ij},d^*_{ij}),G^{int\ ra}(d_{ij},d^*_{ij}),C_{ij}) \qquad (\text{eq. 2})$$

where $G^{int\ ra}$ and $G^{int\ er}$ are different weighting functions and $C_{ij}$ is the conjoint membership level of the classes for the data i and j. For example, it may be considered that $C_{ij}=0$ if the classes of i and j are different and $C_{ij}=1$ if i and j belong to the same class. This formalism may also serve to support concepts of multiple membership, fuzzy membership or probability of membership, by enabling $C_{ij}$ to take values in a range (for example in the range [0, 1]). φ is such that there exists at least one possible value for $C_{ij}$ for which $G=G^{int\ ra}$ and at least one possible value for $C_{iji}$ for which $G=G^{int\ er}$.

For example, the function F may be given by:

$$F(d_{ij}, d^*_{ij}) = |d_{ij} - d^*_{ij}|$$

For example, the function φ may be given by:

$$\phi(G^{int\ ra}(d_{ij}, d^*_{ij}), G^{int\ er}(d_{ij}, d^*_{ij}), C_{ij}) = C_{ij} \times G^{int\ ra}(d_{ij}, d^*_{ij}) + (1 - C_{ij}) \times G^{int\ ra}(d_{ij}, d^*_{ij})$$

where $C_{iji}$ is in the range [0, 1].

For example, the functions $G_{inter}$ and $G_{intra}$ may be given by:

$$G^{int\ ra}(d_{ij}, d^*_{ij}) = g(d_{ij})$$

$$G^{int\ er}(d_{ij}, d^*_{ij}) = g(d^*_{ij})$$

where g is an inverse sigmoid function with parameter λ, such that it is decreasing, defined as follows:

$$g(x) = 1 - \int_{-\infty}^{x} \phi(u, \mu(\lambda), \sigma(\lambda)) du$$

where $\phi(u, \mu(\lambda), \sigma(\lambda))$ is the Gaussian density function with mean $\mu(\lambda)$ and standard deviation $\sigma(\lambda)$, with $$\mu(\lambda) = \underset{i<j}{\text{mean}}(d_{ij}) - 2 \times (1 - \lambda) \times \underset{i<j}{\text{std}}(d_{ij}) \text{ and}$$

$$\sigma(\lambda) = 2 \times \lambda \times \underset{i<j}{\text{std}}(d_{ij});$$

where mean is a function returning the mean defined by:

$$\text{mean}(\{x_1, x_2, \ldots, x_i, \ldots, x_n\}) = \frac{1}{n} \sum_{i=1}^{n} x_i;$$

where std is a function returning the standard deviation defined by:

$$\text{std}(\{x_1, x_2, \ldots, x_i, \ldots, x_n\}) = \sqrt{\frac{1}{n} \sum_{i=1}^{n} (x_i - \text{mean}(x_i))^2}.$$

Thus the map remains faithful to the organization of the data when that is possible, i.e. when the difference between distances observed and reconstructed may be minimized. In case of problems, tears are less penalized if they are produced between two classes and false neighborhoods are better tolerated within the same class. The proposed method advantageously minimizes the number of calculation steps in which information may be lost. Prior art supervised methods lose information in the step of modification of the distances and then in the representation step, whereas the method of the invention loses information only in the representation step. By way of proof, when they are used with original and representation spaces of the same size, the positioning of the data differs, which is not the case with the present method. Such a principle may advantageously make it possible to obtain a representation that is more legible for a user to whom the map is shown, at least if the dissimilarity chosen for comparing the data is linked to the organization of the classes. This proves very useful in the field of discrimination decision-making assistance because, however familiar the user may be with data fishing methods, a map remains a highly intuitive means of visualizing the data. Thus the user may advantageously decide of their own accord on whether a new datum belongs to a group from the map. If there is an associated discriminator, the map enables the user to judge the pertinence of the decision by the discriminator in order to accept or refuse the proposal, as appropriate. The method has the advantage that it does not deform the distances, which may be important if the distances in themselves may be interpreted by the user. Moreover, this enables the use of classic methods for evaluating dimensionality reductions, of the Shepard diagram type, etc. Finally, this facilitates a posteriori positioning of unlabeled data in the representation. The method advantageously offers the possibility of taking into account particular characteristics of data of large dimension ("dimension plague"). The method advantageously enables a degree of membership of each class to be defined. The data may then belong (more or less) to a plurality of classes. Consequently, the classes do not necessarily form a learning data partition.

Figure 2:
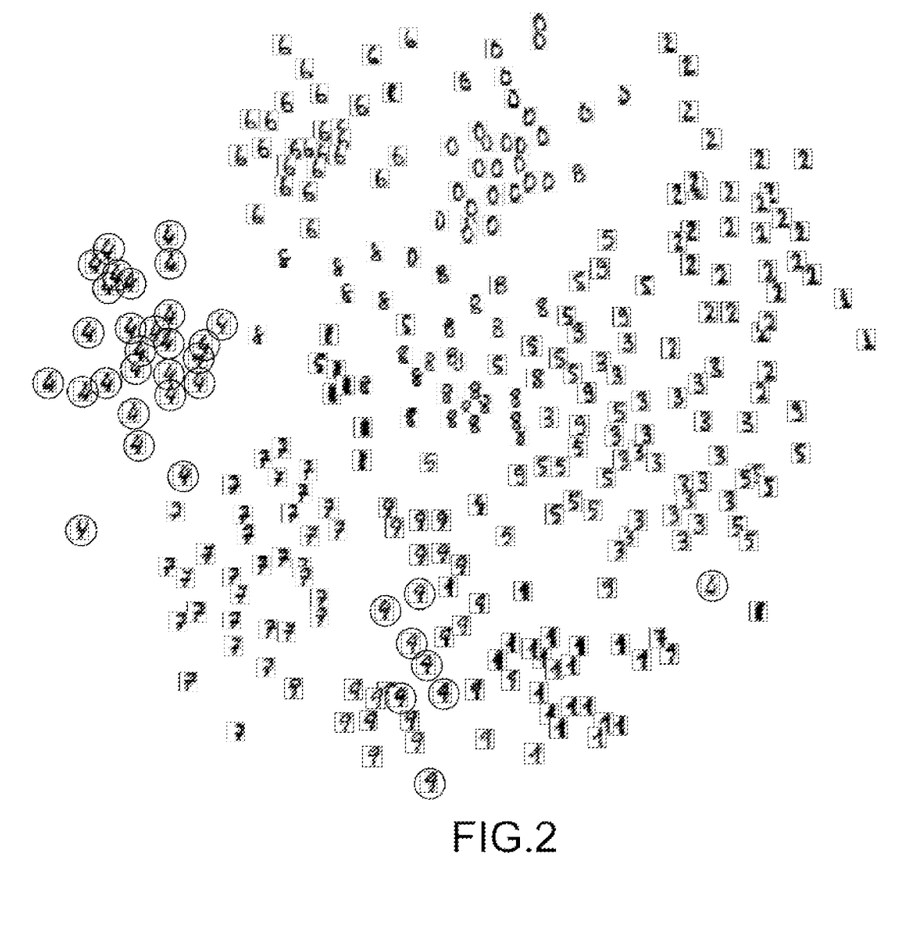
FIG. 2 shows an example of a data map obtained by the prior art DD-HDS method.

FIG. 2 shows an example of a data map produced by the prior art DD-HDS method. For this example, 300 imagettes of 8×8 pixel grayscale handwritten digits, divided into ten balanced classes corresponding to the ten digits (0, 1, 2, ..., 9), have been chosen. This data set has the advantage of being easily interpreted by the human eye, and it is thus easy to evaluate the result obtained visually. The DD-HDS method also uses a weighting function, but this is the same whether the points i and j belong to the same class or not.

Some data belonging to the same class clearly occupy an area of space that is visually identifiable. This is notably the case at the top of the map for the imagettes representing a 0, a 6, a 2 or an 8, which may be grouped in clearly delimited areas that do not overlap.

For other data, the delimitation of areas is less clear, the areas occupied by the classes partially overlapping. This is notably the case in the middle of the map for the imagettes representing a 3, a 5 and a 9, which tend to be mixed because they resemble each other. Thus it is not possible to group a 3 in a clearly delimited area without also including a 9.

Finally, for other data it is even impossible to recognize areas. This is notably the case for the circled imagettes which represent a 4. They are scattered in the bottom of the map, and some may easily be confused with a 9 or a 1. The imagettes representing a 9 are also scattered over the map, and some may be confused with a 3 or a 5. The same may be said for the imagettes representing a 1, which may be confused with a 2 or an 8.

Thus a user can only with great difficulty apprehend the organization of the imagettes on a prior art map.

Figure 3:
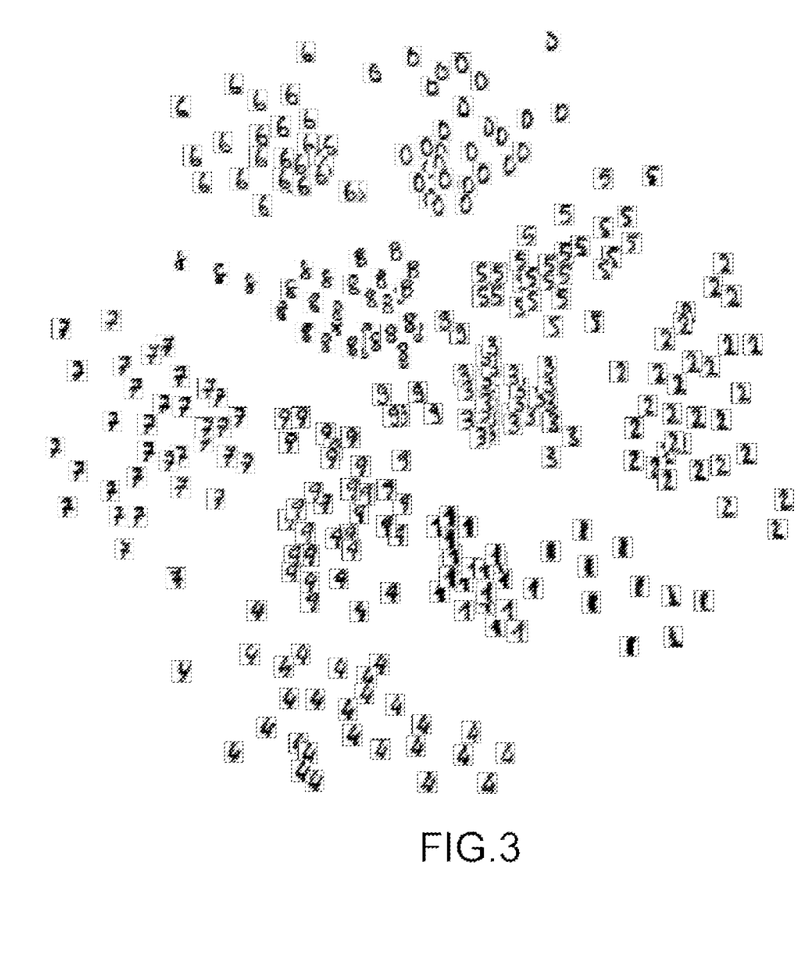
FIG. 3 shows an example of a map of the same data obtained by a system implementing the supervised method of the invention.

FIG. 3 shows an example of a data map produced by a system implementing the method of the invention. The data comprises the same 300 imagettes used for the FIG. 2 example. In the present example, the weighting function G is chosen for example with a parameter λ=0.9.

This time, all the data belonging to the same class clearly occupies the same area of the space. The areas are easy to delimit because they do not overlap. Thus apprehending the organization is much easier on a map of the invention.

Obviously, the invention may also be used on data that is less intelligible, for example seismic curves or photographs of melanomas, for instance, where the benefit is potentially much greater.

Establishing a Shepard diagram is a classic way to evaluate the quality of the preservation of distances. If such diagrams are established for the two examples of FIGS. 2 and 3 by distinguishing intra-class and inter-class distances, it is found that the preservation of short distances is comparable for both methods, short distances being well preserved in both cases. It is above all found that the major difference between the two methods concerns the preservation of long distances, which are more distorted by the supervised method of the invention. However, it is commonly accepted that, in a comparable context, the importance of long distances is negligible. Where short distances are concerned, the distortions are of the same order in quality as in quantity. It is therefore above all else in terms of their position that the representations differ. Evidently, the supervised method of the invention guides the necessary tears between classes and false neighborhoods over the intra-class distances.

It should also be noted that the FIG. 3 map produced using the invention enables account to be taken of ambiguous data, for example a 0 resembling a 6 (top center), a 9 that could equally well be a 3 or an 8 (center), etc. Consequently, this representation is much clearer for the user.

The present invention has the further advantage of not assuming that the data space is Euclidian, any distance in this space or even any dissimilarity being usable. Moreover, it does not necessitate choosing a kernel and makes no assumption as to a model implicit in the data. Unlike the prior art supervised methods, it does not degrade the original distances; it is compatible with the methods of evaluating the dimensionality reduction methods of the Shepard diagram type and makes it less difficult to position new data a posteriori. Finally, the system producing the data map shown in FIG. 3 may be implemented on most computers provided with a graphical display device.

The present invention is therefore of considerable benefit in the field of assisting decision-making in discrimination, where an intuitive presentation of the organization of the data proves very useful. Initially, the invention enables construction of a map from a set of learning data. Then, unlabeled test data may be presented. Situating this test data on the map may be effected in a number of ways. It is possible to position the data a posteriori, but it is seen that this may be more or less efficacious depending on the data sets. Consequently, it is recommended that the distances between learning data and test data be presented by another method, for which the applicant has also filed a patent application.

The foregoing example of imagettes is given by way of illustration only. The present invention is equally applicable to all kinds of data, notably digitized data. This digitized data may include measurements of physical characteristics of very varied objects other than photos, whether these be material objects, persons, states of a system, or a group of such objects, persons or states, physical characteristics of which are measured.

The digitized data may naturally include scalars, i.e. real numbers, such as measurements supplied by a sensor.

But the digitized data may equally include symbols (alphabet element) such as an element value from a finite set (letter of a word, name of an object, etc.).

The digitized data may equally include vectors, such as a measurement from a sensor accompanied by its uncertainty or a set of measurements from an array of sensors or a signal (sequence of measurements, flows, etc.) or a set of values from a database or a word, a phrase, a text or a set of normalized measurements (proportions) or any scalar or symbolic data set.

The digitized data may also include matrices, such as a plane black and white image or a set of signals from an array of sensors or genetic data or any vectorial data set.

The digitized data may also include multidimensional tables, such as a sequence of images (video) or a multispectrum image (satellite image) or a color image (photograph, simulation result) or a 3D image (scanner) or a multidimensional meshing (simulation model) or any set of matrix data or multidimensional tables of smaller dimension.

The digitized data may also include graphs and networks, such as a social network or the Internet network or a transport network (road traffic, information, energy, etc.) or an interaction network (proteins, genes) or an array of sensors or a digital modeling meshing (2D, 3D, 3D with time modeling, etc.).

The digitized data may also include cellular complexes or hypergraphs, such as a digital modeling meshing (virtual objects, multiphysical modeling, animated films) or biological or molecular or physical or climatic or mechanical or chemical models.

The digitized data may also include complex data such as multimedia documents (organized set of texts, videos, audio signals, etc.) or a collection of documents or any set of organized documents (library).

The digitized data may also include service subscription agreements, such as telephone subscription agreements, for example. The method and the system of the present invention could then advantageously enable the telephone tariff best suited to the profile of the user to be chosen.

The invention claimed is:

1. A method for evaluating the class of a test datum in an original metric space, each datum belonging to at least one class grouping a plurality of data, the method comprising:
graphical representation of the spatial organization of a set of learning data of the original space in a representation metric space, a conjoint membership level indicating if any two data from the learning set belong to the same class, the representation step including:
projecting data from the learning set toward the representation metric space, the positions of the projections of the data in the representation space being those that minimize or maximize a function E, the function E depending on the differences between the weighted distances between the data from the learning set in the original space and the distances between their respective projections in the representation space, the weighting assigned in the function E to a distance between two data from the learning set depending on the fact that these two data belong to the same class, so as to preserve in the representation space the relative spatial organization of the classes;
representation of the projections of the data from the learning set;
relating the test datum to the projections of the data from the learning set, the most probable class of the test datum being the class of the projections of the data from the learning set related to the test datum.

2. The method as claimed in claim 1, wherein the data consists of digitized data.

3. The method as claimed in claim 2, wherein the digitized data includes one or more measurements of physical characteristics of an object.

4. The method as claimed in claim 3, wherein the object is:
a material object or a group of material objects, or
a person or a group of persons, or
a state of a system or a group of states of a system.

5. The method as claimed in claim 1, wherein the relative spatial organization of the classes is preserved in the representation space in that two distinct classes of data from the learning set have the projections of their data assembled in two respective disjoint connected areas if the data of these two classes is itself assembled in two disjoint connected areas of the original space.

6. The method as claimed in claim 5, wherein the relating step includes a step of projection of the test datum into the representation space, the most probable class of the test datum being the class corresponding to the connected area in which the projection of the test datum is located.

7. The method as claimed in claim 1, wherein the original metric space has N≥3 dimensions and the representation metric space has 2 or 3 dimensions.

8. The method as claimed in claim 1, wherein the projections of the data from the learning set is represented in an orthonomic frame of reference of the representation metric space.

9. The method as claimed in claim 1, wherein a distance $d^*_{ij}$ in the representation space between the projections of any two data i and j from the learning set is the distance that minimizes a stress function $$E = \sum_{i,j} E_{ij},$$

where $E_{ij}$ is a local stress function depending on the distance between the data i and j, such as $E_{ij} = F(d_{ij}, d^*_{ij}) \times G(d_{ij}, d^*_{ij})$, where:
- $d_{ij}$ is a measurement of dissimilarity between the data i and j in the original space and $d^*_{ij}$ is the distance between the projections of the data i and j in the representation space;
- F is a function that quantifies the difference between $d_{ij}$ and $d^*_{ij}$, F being minimum when $d_{ij} = d^*_{ij}$;
- G is a weighting function such as $G(d_{ij}, d^*_{ij}) = \phi(G^{intra}(d_{ij}, d^*_{ij}), G^{intra}(d_{ij}, d^*_{ij}), C_{ij})$, where
- $C_{ij}$ is the conjoint membership level having a value in a real interval;
- $G^{intre}$ and $G^{intra}$ are weighting functions;
- $\phi$ is a function such that there exists at least one value of $C_{ij}$ for which $G = G^{intra}$ and at least one value of $C_{ij}$ for which $G = G^{inter}$.

10. The method as claimed in claim 9, wherein the conjoint membership level has a value in {0,1}, having the value 1 if i and j belong to the same class and having the value 0 otherwise.

11. The method as claimed in claim 9, wherein:
$F(d_{ij}, d^*_{ij}) = |d_{ij} - d^*_{ij}|^2$;
$G^{intra}(d_{ij}, d^*_{ij}) = g(d_{ij})$ and $G^{inter}(d_{ij}, d^*_{ij})$, where g is the inverse sigmoid function with parameter λ.

12. The method for assisting a user to decide on the class of a test datum in a data space of N dimensions where N≥3, each datum belonging to a class grouping a plurality of data, the method comprising:
- a step as claimed in claim 1 of evaluating the class of the test datum;
- a step of presentation to the user of the most probable class for the test datum.

13. The method as claimed in claim 12, further comprising a step of the user assigning a class to the test datum, the class assigned by the user to the test datum may be the same or not the same as the most probable class.

14. The method as claimed in claim 1, wherein the data consists of digitized handwritten characters, the classes grouping identical characters.

15. The method as claimed in claim 1, wherein the data consists of digitized seismic curves, one class grouping curves of which the recording corresponds to an earth tremor and another class grouping curves of which the recording does not correspond to an earth tremor.

16. The method as claimed in claim 1, wherein the data consists of digital photographs of melanomas, one class grouping photographs of malignant melanomas and another class grouping photographs of benign melanomas.

17. A system for evaluating the class of a test datum in an original metric space, each datum belonging to at least one class grouping a plurality of data, the system comprising:
- a module for graphical representation of the spatial organization of a set of learning data of the original space in a representation metric space, a conjoint membership level indicating if any two data from the learning set belong to the same class, the representation module including:
  - a module for projecting data from the learning set toward the representation metric space, the positions of the projections of the data in the representation space being those that minimize or maximize a function E, the function E depending on the differences between the weighted distances between the data from the learning set in the original space and the distances between their respective projections in the representation space, the weighting assigned in the function E to a distance between two data from the learning set depending on the fact that these two data belong to the same class, so as to preserve in the representation space the relative spatial organization of the classes;
  - a module for representing the projections of the data from the learning set;
- a module for relating the test datum to the projections of the data from the learning set, the most probable class of the test datum being the class of the projections of the data from the learning set related to the test datum.

18. The system as claimed in claim 17, wherein the data consists of digitized data.

19. The system as claimed in claim 18, wherein the digitized data includes one or more measurements of physical characteristics of an object.

20. The system as claimed in claim 19, wherein the object is:
- a material object or a group of material objects, or
- a person or a group of persons, or
- a state of a system or a group of states of a system.

21. The system as claimed in claim 17, wherein the relative spatial organization of the classes is preserved in the representation space in that two distinct classes of data from the learning set have the projections of their data assembled in two respective disjoint connected areas if the data of these two classes is itself assembled in two disjoint connected areas of the original space.

22. The system as claimed in claim 21, wherein the relating module includes a module for projecting the test datum into the representation space, the most probable class of the test datum being the class corresponding to the connected area in which the projection of the test datum is located.

23. The method as claimed in claim 17, wherein the original metric space has N≥3 dimensions and the representation metric space has 2 or 3 dimensions.

24. The system as claimed in claim 17, wherein the projections of the data from the learning set is represented in an orthonomic frame of reference of the representation metric space.

25. The system as claimed in claim 17, wherein a distance $d^*_{ij}$ in the representation space between the projections of any two data i and j from the learning set is the distance that minimizes a stress function $$E = \sum_{i,j} E_{ij},$$

where $E_{ij}$ is a local stress function depending on the distance between the data i and j, such as $E_{ij}=F(d_{ij},d^*_{ij})\times G(d_{ij},d^*_{ij})$, where:
- $d_{ij}$ is a measurement of dissimilarity between the data i and j in the original space and $d^*_{ij}$ is the distance between the projections of the data i and j in the representation space;
- F is a function that quantifies the difference between $d_{ij}$ and $d^*_{ij}$, F being minimum when $d_{ij}=d^*_{ij}$,
- G is a weighting function such as $G(d_{ij},d^*_{ij})=\phi(G^{intra}(d_{ij},d^*_{ij}),G^{inter}(d_{ij},d^*_{ij}),C_{ij})^*$, where $C_{ij}$ is the conjoint membership level having a value in a real interval;
- $G^{intra}$ and $G^{inter}$ are weighting functions;
- $\phi$ is a function such that there exists at least one value of $C_{ij}$ for which $G=G^{intra}$ and at least one value of $C_{ij}$ for which $G=G^{inter}$.

26. The system as claimed in claim 25, wherein the conjoint membership level has a value in $\{0,1\}$, having the value 1 if i and j belong to the same class and having the value 0 otherwise.

27. The system as claimed in claim 25, wherein:
$F(d_{ij},d^*_{ij})=|d_{ij}-d^*_{ij}|^2$;
$G^{intra}(d_{ij},d^*_{ij})=g(d_{ij})$ and $G^{inter}(d_{ij},d^*_{ij})=g(d^*_{ij})$, where g is the inverse sigmoid function with parameter $\lambda$.

28. A system for assisting a user to decide on the class of a test datum in a data space of N dimension where $N \geq 3$, each datum belonging to a class grouping a plurality of data, the system comprising:
- a subsystem as claimed in claim 17 for evaluating the class of the test datum;
- a module for presentation to the user of the most probable class for the test datum.

29. The system as claimed in claim 28, further comprising a module enabling the user to assign a class to the test datum, the class assigned by the user to the test datum may be the same or not the same as the most probable class.

30. The system as claimed in claim 17, wherein the data consists of digitized handwritten characters, the classes grouping identical characters.

31. The system as claimed in claim 17, wherein the data consists of digitized seismic curves, one class grouping curves of which the recording corresponds to an earth tremor and another class grouping curves of which the recording does not correspond to an earth tremor.

32. The system as claimed in claim 17, wherein the data consists of digital photographs of melanomas, one class grouping photographs of malignant melanomas and another class grouping photographs of benign melanomas.

* * * * *